US012788025B2

(12) United States Patent
Zhou

(10) Patent No.: US 12,788,025 B2
(45) Date of Patent: Nov. 10, 2026

(54) DRIVE BODY FOR COLD BEVERAGE MAKER

(71) Applicant: Guangzhou Xin'an Trading Co., Ltd., Guangzhou (CN)

(72) Inventor: Quan Zhou, Guangzhou (CN)

(73) Assignee: Guangzhou Xin'an Trading Co., Ltd., Guangzhou (CN)

( * ) Notice: Subject to any disclaimer, the term of this patent is extended or adjusted under 35 U.S.C. 154(b) by 109 days.

(21) Appl. No.: 19/017,896

(22) Filed: Jan. 13, 2025

(65) Prior Publication Data

US 2026/0060270 A1 Mar. 5, 2026

(30) Foreign Application Priority Data

Aug. 29, 2024 (CN) ......................... 202422122393.5
Sep. 6, 2024 (CN) ......................... 202422199171.3

(51) Int. Cl.
*A23G 9/22* (2006.01)
*A23G 9/04* (2006.01)
*A23G 9/08* (2006.01)

(52) U.S. Cl.
CPC ............... *A23G 9/22* (2013.01); *A23G 9/045* (2013.01); *A23G 9/08* (2013.01)

(58) Field of Classification Search
CPC .......... A23G 9/22; A23G 9/222; A23G 9/045; A23G 9/08; A23G 9/12; A23G 9/228; A23G 9/28
See application file for complete search history.

(56) References Cited

FOREIGN PATENT DOCUMENTS

| | | | | |
|---|---|---|---|---|
| CN | 219474026 U | * | 8/2023 | |
| CN | 118383446 A | * | 7/2024 | ................ F25C 5/04 |

* cited by examiner

*Primary Examiner* — Joseph F Trpisovsky

(57) ABSTRACT

The present disclosure provides a drive body for a cold beverage maker, including a drive housing and an evaporator end cover, where an evaporator port for allowing an internal component of an evaporator to pass through is formed in the evaporator end cover; the drive housing includes a head portion and a control portion; for embedding of the evaporator end cover, an end cover groove is formed in the head portion; a component port corresponding to the evaporator port is formed in a bottom of the end cover groove; the evaporator end cover is provided with a convex frontal portion; a contact switch is provided in the convex frontal portion; the convex frontal portion is provided with a trigger travel hole corresponding to the contact switch. The present disclosure is assembled conveniently, with the stable structure and the high safety in use.

10 Claims, 3 Drawing Sheets

DRIVE BODY FOR COLD BEVERAGE MAKER

CROSS REFERENCE TO RELATED APPLICATIONS

The present application claims the benefit of Chinese Patent Application Nos. 202422199171.3 filed on Sep. 6, 2024 and 202422122393.5 filed on Aug. 29, 2024. All the above are hereby incorporated by reference in their entirety.

TECHNICAL FIELD

The present disclosure relates to the technical field of cold beverage makers, and in particular to a drive body for a cold beverage maker.

BACKGROUND

The existing cold beverage maker, particularly the smoothie maker, includes an ice-making chamber for forming the smoothie and storing the smoothie, and an evaporator provided in the ice-making chamber. Based on the use requirement, the evaporator is mounted horizontally or vertically. Usually, copper tubes are provided fully on the evaporator to cause a large weight. For the cold beverage maker in which the evaporator is provided horizontally, and the main body is a housing structure, with the existing conventional screwed connection, the evaporator is sagged easily for an overweight load in long-term use. When the ice-making chamber is sleeved to the evaporator, the related junction is prone to deformation to cause a gap, resulting in poor sealed installation.

On the other hand, for the existing cold beverage maker, a scraper for delivering the smoothie is provided, and the ice-making chamber is detachable. This causes potential safety hazards.

SUMMARY

A technical problem to be solved by an embodiment of the present disclosure is to provide a drive body. The present disclosure is assembled conveniently, with the stable structure and the high safety in use.

To solve the above-mentioned technical problem, an embodiment of the present disclosure provides a drive body, including a drive housing for mounting a drive device and an evaporator end cover for mounting an evaporator in a docking manner, where an evaporator port for allowing an internal component of the evaporator to pass through is formed in the evaporator end cover;

- the drive housing includes a head portion for mounting the evaporator and a control portion for mounting a control component; for embedding of the evaporator end cover, an end cover groove matching with the evaporator end cover is formed in the head portion; and a component port corresponding to the evaporator port is formed in a bottom of the end cover groove;
- the evaporator end cover is provided with a convex frontal portion contacting an ice-making chamber; a contact switch is provided in the convex frontal portion; and the convex frontal portion is provided with a trigger travel hole corresponding to the contact switch, so as to guide an external trigger member to contact and trigger the contact switch; and
- the evaporator end cover is provided with a bearing insertion post for connecting the head portion; the bearing insertion post is provided with a transverse support rib and a longitudinal support rib; and support limiting holes respectively matching with the bearing insertion post, the transverse support rib and the longitudinal support rib are formed in the bottom of the end cover groove.

As an improvement to the above solution, a docking ring for insertion of the ice-making chamber is provided at the evaporator port of the evaporator end cover; and a sealing ring is sleeved on the docking ring.

As an improvement to the above solution, for nesting of an inner turnup of the sealing ring, a sealing groove is formed at an inner side of the docking ring.

As an improvement to the above solution, an evaporator connecting post for connecting and fixing the evaporator is provided in the sealing groove; and an evaporator connecting hole for a threaded connection is formed in the evaporator connecting post.

As an improvement to the above solution, the sealing groove is annular, and is divided into an upper annular groove and a lower annular groove; and the lower annular groove is located under the upper annular groove; and

- a plurality of sidewall notches are formed in an inner sidewall of the lower annular groove; and the inner turnup is squeezed into the sidewall notch after deformation under a pressure.

As an improvement to the above solution, pull connecting holes corresponding to each other are respectively formed in the evaporator end cover and the head portion; an elastic connecting strip is provided at an edge of the sealing ring, to sequentially pass through the pull connecting holes of the evaporator end cover and the pull connecting holes of the head portion; and the elastic connecting strip is provided with a conical head squeezed into the pull connecting hole, so as to limit separation of the elastic connecting strip from the pull connecting hole.

As an improvement to the above solution, the pull connecting holes of the evaporator end cover are distributed at a periphery of the upper annular groove, and located above the sidewall notches.

As an improvement to the above solution, the evaporator end cover is provided with auxiliary location connecting posts; and for insertion of the auxiliary location connecting posts, the head portion is provided with locating grooves respectively matching with the auxiliary location connecting posts; and

- the locating grooves are distributed at two sides of the component port, and located below the support limiting hole.

As an improvement to the above solution, the control portion and the head portion communicate with each other and form an L-shaped structure; and a component communicating port for allowing an external component or an external wire to pass through is formed in a bottom of the head portion.

As an improvement to the above solution, rotating shafts for mounting a handle are respectively provided at two sides of the drive housing; and a hand-gripping groove is formed in a top of the drive housing, such that when the handle is attached to the top of the drive housing, a hand is inserted into the hand-gripping groove to lift the handle.

The present disclosure has the following beneficial effects:

The embodiment of the present disclosure provides a drive body, including a drive housing and an evaporator end cover. An evaporator port for allowing an internal component of the evaporator to pass through is formed in the evaporator end cover.

The drive housing includes a head portion for mounting the evaporator and a control portion. For embedding of the evaporator end cover, an end cover groove matching with the evaporator end cover is formed in the head portion. A component port corresponding to the evaporator port is formed in a bottom of the end cover groove. In assembly, the evaporator is connected to the evaporator end cover. The evaporator end cover is embedded into the end cover groove to preliminarily mount the evaporator and the drive housing, and is then screwed.

Moreover, the evaporator end cover is provided with a convex frontal portion contacting an ice-making chamber. A contact switch is provided in the convex frontal portion. The convex frontal portion is provided with a trigger travel hole corresponding to the contact switch, so as to guide an external trigger member to contact and trigger the contact switch. Hence, for the ice-making chamber, only the corresponding trigger member is provided. After the ice-making chamber is mounted in place, the contact switch can be triggered, thereby starting the related device safely.

The evaporator end cover is provided with a bearing insertion post for connecting the head portion. The bearing insertion post is provided with a transverse support rib and a longitudinal support rib. Support limiting holes respectively matching with the bearing insertion post, the transverse support rib and the longitudinal support rib are formed in the bottom of the end cover groove. In this way, the bearing insertion post can bear the load of the evaporator end cover together with the end cover groove. Meanwhile, the structural strength of the bearing insertion post can also be enhanced.

DETAILED DESCRIPTION

In order to make the objectives, technical solutions, and advantages of the present disclosure clearer, the present disclosure will be further described below in detail with reference to the accompanying drawings.

Figure 1:
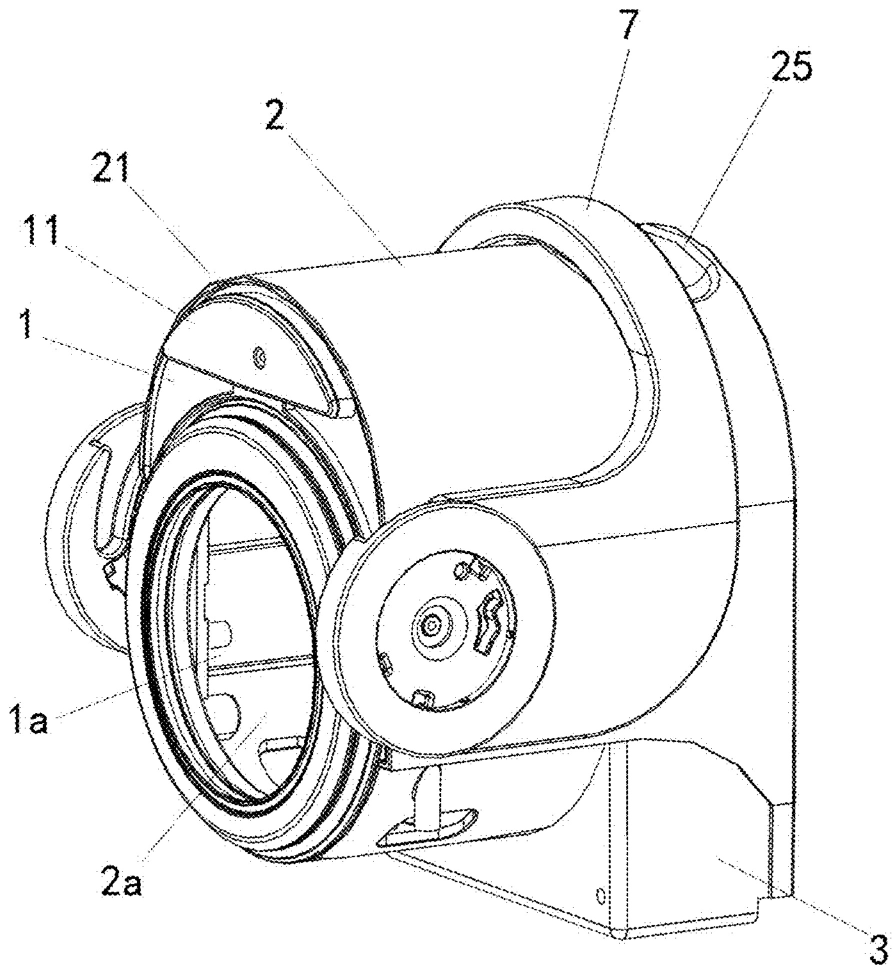
FIG. 1 is a schematic perspective view of a drive body according to the present disclosure.
Figure 2:
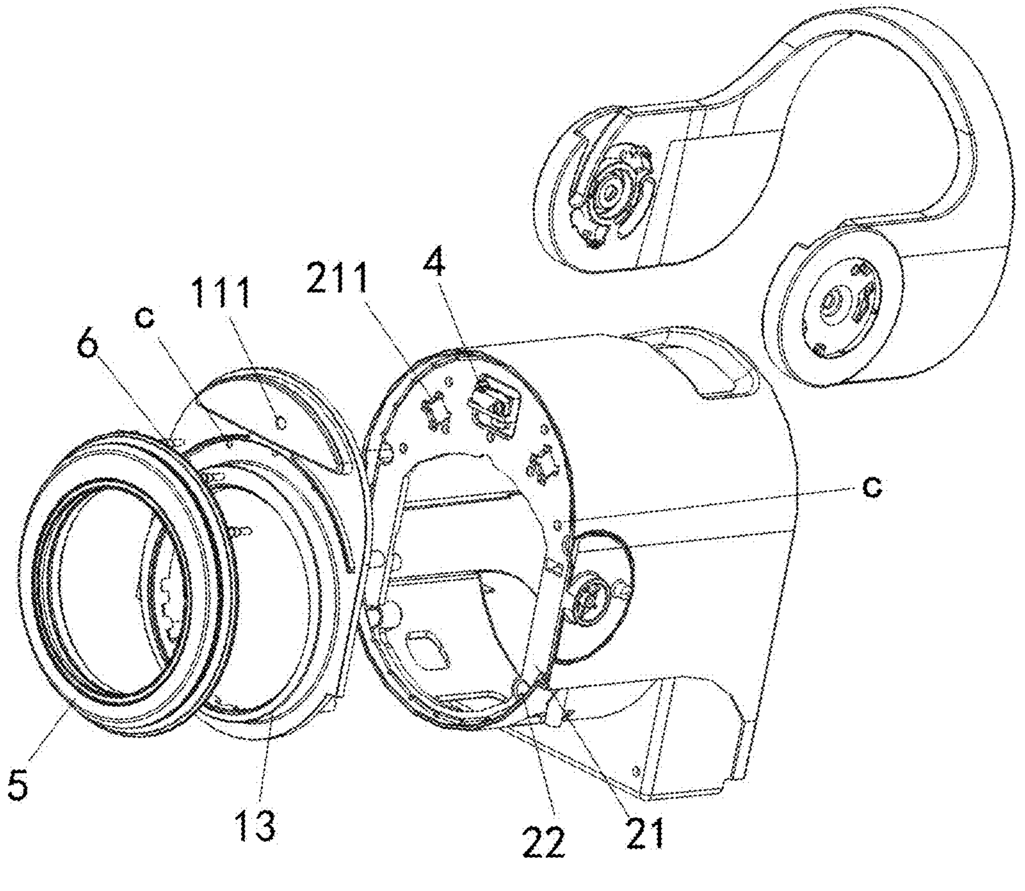
FIG. 2 is a schematic exploded view of a drive body according to the present disclosure.
Figure 3:
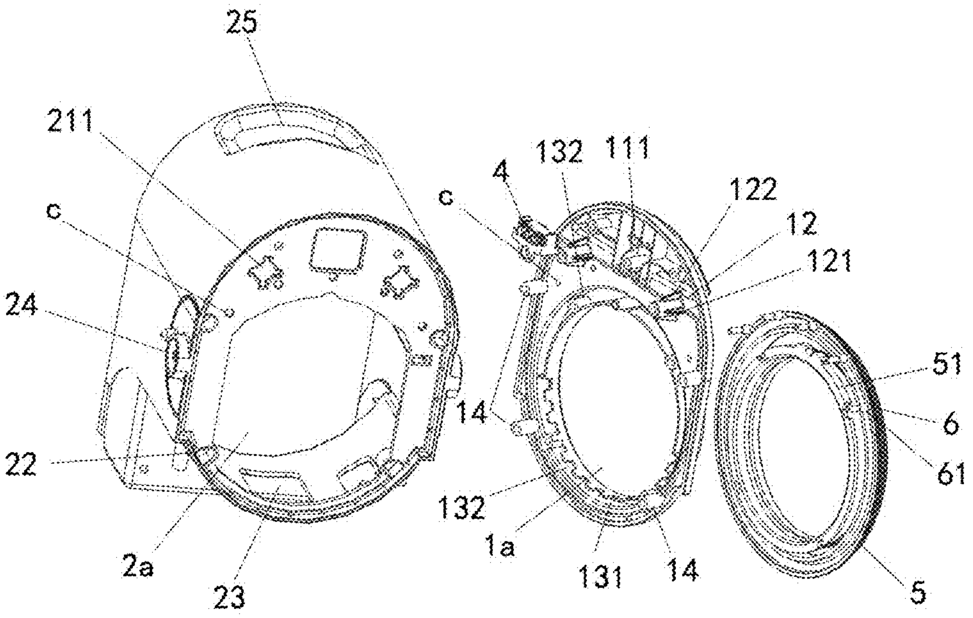
FIG. 3 is a schematic exploded view of a drive body from another angle according to the present disclosure.

Referring to FIG. 1, FIG. 2 and FIG. 3, an embodiment of the present disclosure provides a drive body, including a drive housing for mounting a drive device and an evaporator end cover 1 for mounting an evaporator in a docking manner. An evaporator port 1*a* for allowing an internal component of the evaporator to pass through is formed in the evaporator end cover 1.

The drive housing includes a head portion 2 for mounting the evaporator and a control portion 3 for mounting a control component. For embedding of the evaporator end cover 1, an end cover groove 21 matching with the evaporator end cover 1 is formed in the head portion 2. A component port 2*a* corresponding to the evaporator port 1*a* is formed in a bottom of the end cover groove 21.

The evaporator end cover 1 is provided with a convex frontal portion 11 contacting an ice-making chamber. A contact switch 4 is provided in the convex frontal portion 11. The convex frontal portion 11 is provided with a trigger travel hole 111 corresponding to the contact switch 4, so as to guide an external trigger member to contact and trigger the contact switch 4.

The evaporator end cover 1 is provided with a bearing insertion post 12 for connecting the head portion 2. The bearing insertion post 12 is provided with a transverse support rib 121 and a longitudinal support rib 122. Support limiting holes 211 respectively matching with the bearing insertion post 12, the transverse support rib 121 and the longitudinal support rib 122 are formed in the bottom of the end cover groove 21.

Specifically, a docking ring 13 for insertion of the ice-making chamber is provided at the evaporator port 1*a* of the evaporator end cover 1. A sealing ring 5 is sleeved on the docking ring 13, so as to improve airtightness of the ice-making chamber in use. The contact switch 4 is the prior art, and its structural principle is not repeated herein.

Moreover, the ice-making chamber and the docking ring 13 are to be detached in daily use for cleaning. The sealing ring 5 sleeved on the docking ring 13 is to be embedded into a docking port of the ice-making chamber. In detachment, a pulling force is applied to the sealing ring 5, such that the sealing ring 5 falls off. In view of this, for nesting of an inner turnup 51 of the sealing ring 5, a sealing groove 131 is formed at an inner side of the docking ring 13. This greatly improves the stability of the sealing ring 5.

An evaporator connecting post 132 for connecting and fixing the evaporator is provided in the sealing groove 131. An evaporator connecting hole for a threaded connection is formed in the evaporator connecting post 132. An evaporator housing may be in bolted connection through the evaporator connecting post 132. Preferably, the evaporator connecting hole is a threaded hole.

Further, the sealing groove 131 is annular, and is divided into an upper annular groove and a lower annular groove. The lower annular groove is located under the upper annular groove.

A plurality of sidewall notches 133 are formed in an inner sidewall of the lower annular groove. The inner turnup 51 is squeezed into the notch 133 after deformation under a pressure. In this way, when the sealing ring 5 is selected, the sealing ring 5 with a slightly larger size can be selected to facilitate the sleeving and mounting of the sealing ring 5. When the evaporator is mounted, an outer wall of the evaporator squeezes the sealing ring 5 to cause deformation of the sealing ring 5. Consequently, a part of the sealing ring 5 is squeezed into the sidewall notch 133 to hook the lower annular groove.

Further, in order to improve the stability of the sealing ring 5, and enhance the connection between the evaporator end cover 1 and the head portion 2, pull connecting holes c corresponding to each other are formed in the evaporator end cover 1 and the head portion 2. An elastic connecting strip 6 is provided at an edge of the sealing ring 5 to sequentially pass through the pull connecting holes c of the evaporator end cover 1 and the pull connecting holes c of the head portion 2. The elastic connecting strip 6 is provided with a conical head 61 squeezed into the pull connecting hole c, so as to limit separation of the elastic connecting strip from the pull connecting hole c. Through contractility of the elastic connecting strip 6, the sealing ring 5, the evaporator end cover 1 and the head portion 2 are tensioned together.

Preferably, the pull connecting holes c of the evaporator end cover 1 are distributed at a periphery of the upper annular groove, and located above the sidewall notches 133.

In order to improve the preliminary mounting stability between the evaporator end cover 1 and the head portion 2, the evaporator end cover 1 is provided with auxiliary location connecting posts 14. For insertion of the auxiliary location connecting posts 14, the head portion 2 is provided with locating grooves 22 respectively matching with the auxiliary location connecting posts 14.

The locating grooves 22 are distributed at two sides of the component port 2*a*, and located below the support limiting hole 211. Therefore, the evaporator end cover 1 and the head portion 2 are supported and connected uniformly overall in mounting and connection.

In order that the drive body is preliminarily located and mounted in overall assembly of the cold beverage maker, the control portion 3 and the head portion 2 communicate with each other and form an L-shaped structure. Through a staircase structure of the L-shaped structure, the drive body is preliminarily located and mounted. A component communicating port 23 for allowing an external component or an external wire to pass through is formed in a bottom of the head portion 2.

In order that the finally assembled cold beverage maker is portable, rotating shafts 24 for mounting a handle are respectively provided at two sides of the drive housing. A hand-gripping groove 25 is formed in a top of the drive housing. Therefore, in actual assembly, the corresponding handle 7 can be mounted according to an actual need. Meanwhile, in response to a special design of the handle, for example, the handle is attached to the top of the drive housing, such that the handle 7 is gripped hardly, the hand-gripping groove is provided. When the handle is attached to the top of the drive housing, the hand can be inserted into the hand-gripping groove 25 to lift the handle 7.

The above are merely preferred implementations of the present disclosure. It should be noted that a person of ordinary skill in the art may further make several improvements and modifications without departing from the principle of the present disclosure. These improvements and modifications should fall within the protection scope of the present disclosure.

The invention claimed is:

1. A drive body for a cold beverage maker, comprising a drive housing for mounting a drive device and an evaporator end cover for mounting an evaporator in a docking manner, wherein an evaporator port for allowing an internal component of the evaporator to pass through is formed in the evaporator end cover;

the drive housing comprises a head portion for mounting the evaporator and a control portion for mounting a control component; for embedding of the evaporator end cover, an end cover groove matching with the evaporator end cover is formed in the head portion; and a component port corresponding to the evaporator port is formed in a bottom of the end cover groove;

the evaporator end cover is provided with a convex frontal portion contacting an ice-making chamber; a contact switch is provided in the convex frontal portion; and the convex frontal portion is provided with a trigger travel hole corresponding to the contact switch, so as to guide an external trigger member to contact and trigger the contact switch; and the evaporator end cover is provided with a bearing insertion post for connecting the head portion; the bearing insertion post is provided with a transverse support rib and a longitudinal support rib; and support limiting holes respectively matching with the bearing insertion post, the transverse support rib and the longitudinal support rib are formed in the bottom of the end cover groove.

2. The drive body according to claim 1, wherein a docking ring for insertion of the ice-making chamber is provided at the evaporator port of the evaporator end cover; and a sealing ring is sleeved on the docking ring.

3. The drive body according to claim 2, wherein for nesting of an inner turnup of the sealing ring, a sealing groove is formed at an inner side of the docking ring.

4. The drive body according to claim 3, wherein an evaporator connecting post for connecting and fixing the evaporator is provided in the sealing groove; and an evaporator connecting hole for a threaded connection is formed in the evaporator connecting post.

5. The drive body according to claim 3, wherein the sealing groove is annular, and is divided into an upper annular groove and a lower annular groove; and the lower annular groove is located under the upper annular groove; and a plurality of sidewall notches are formed in an inner sidewall of the lower annular groove; and the inner turnup is squeezed into the sidewall notch after deformation under a pressure.

6. The drive body according to claim 5, wherein pull connecting holes corresponding to each other are respectively formed in the evaporator end cover and the head portion; an elastic connecting strip is provided at an edge of the sealing ring, to sequentially pass through the pull connecting holes of the evaporator end cover and the pull connecting holes of the head portion; and the elastic connecting strip is provided with a conical head squeezed into the pull connecting hole, so as to limit separation of the elastic connecting strip from the pull connecting hole.

7. The drive body according to claim 6, wherein the pull connecting holes of the evaporator end cover are distributed at a periphery of the upper annular groove, and located above the sidewall notches.

8. The drive body according to claim 1, wherein the evaporator end cover is provided with auxiliary location connecting posts; and for insertion of the auxiliary location connecting posts, the head portion is provided with locating grooves respectively matching with the auxiliary location connecting posts; and the locating grooves are distributed at two sides of the component port, and located below the support limiting hole.

9. The drive body according to claim 1, wherein the control portion and the head portion communicate with each other and form an L-shaped structure; and a component communicating port for allowing an external component or an external wire to pass through is formed in a bottom of the head portion.

10. The drive body according to claim 1, wherein rotating shafts for mounting a handle are respectively provided at two sides of the drive housing; and a hand-gripping groove is formed in a top of the drive housing, such that when the handle is attached to the top of the drive housing, a hand is inserted into the hand-gripping groove to lift the handle.

* * * * *